United States Patent [19]
McKee

[11] 4,310,807
[45] Jan. 12, 1982

[54] DIGITAL POSITION SENSOR INCLUDING L/C SENSING OSCILLATOR

[75] Inventor: Donald E. McKee, Yorba Linda, Calif.

[73] Assignee: Rockwell International Corporation, El Segundo, Calif.

[21] Appl. No.: 105,435

[22] Filed: Dec. 19, 1979

[51] Int. Cl.³ .................. G01V 3/11; H03K 3/023
[52] U.S. Cl. ................... 331/65; 324/327; 331/117 R; 331/167; 331/181
[58] Field of Search ............... 331/65, 117 R, 167, 331/181; 324/327, 236; 340/551, 561, 562, 686

[56] References Cited
U.S. PATENT DOCUMENTS 3,891,918  6/1975  Ellis ........................... 324/236 X
4,241,317  12/1980  Breitling ........................ 331/65

*Primary Examiner*—Siegfried H. Grimm
*Attorney, Agent, or Firm*—H. Fredrick Hamann; Rolf M. Pitts; Edward A. Sokolski

[57] ABSTRACT

A position sensing element forms a reactance (inductive or capacitive) in the L/C tuning circuit of an oscillator. The reactance varies as a function of the position of the sensing element relative to a predetermined object. This causes the resonant frequency of the oscillator to vary as a function of the position of the sensing element. The output of the oscillator is squared to provide a square wave signal, the frequency of which is a direct function of the position of the sensing element relative to the predetermined object.

4 Claims, 3 Drawing Figures

DIGITAL POSITION SENSOR INCLUDING L/C SENSING OSCILLATOR

This invention relates to electrical position sensors and more particularly to such a sensor employing a reactive sensing element which controls the frequency of a resonant circuit.

Position sensors having capacitive or inductive sensing elements are used extensively in control systems of various types, often in connection with servo control loops. In order to increase the sensitivity of the sensor, circuits have been developed in the prior art which incorporate the reactive sensor into a resonant circuit. Such a device is described in U.S. Pat. No. 3,230,519, issued Jan. 18, 1966, to Metz et al. In the circuit of the Metz et al. patent, a capacitive sensor is used and is placed in a balanced bridge circuit to which an oscillatory signal is fed from an external source. Inductance and additional capacitance are provided in the circuit to provide resonance at the output frequency of the signal source. The magnitude of the output signal then varies as a function of the position of the sensor, these amplitude variations occurring in accordance with the resonance curve of the resonant circuit. With a relatively high Q resonant circuit, high sensitivity to variations in the reactance of sensor elements is achieved. This type of circuit, while providing high sensitivity, has several shortcomings. First, in view of the fact that the output signal involves variations in amplitude, it is essential for proper operation that variations in amplitude due to other causes, such as variations in the amplitude of the signal source and variations in power supply voltage, be minimized. This often presents serious design problems. Further, most systems presently in use are digitally implemented which means that an amplitude varying signal must be converted to digital form which requires additional circuitry and may involve a loss of accuracy in the conversion process.

The circuit of the present invention overcomes the aforementioned shortcomings of the prior art in that it involves the direct generation of a digital signal and is not dependent on amplitude variations in such signal, but is only frequency dependent. The improvement is achieved in the circuit of the present invention by incorporating the reactive sensing element in the L/C tuning circuit of an oscillator. The oscillator employs a unique feedback arrangement whereby positive and negative feedback loops are employed, one of these loops having purely resistive elements, the other of these loops including the L/C reactive tuning elements. The feedback loops are designed so that the reactance presented in the feedback loop containing the reactive elements is such as to provide the bare minimum of positive feedback necessary to sustain oscillation at the resonant frequency, there being negative feedback provided above and below the resonant frequency. This operates to improve the stability of the oscillator. The output of the oscillator is fed to a squaring circuit where it is converted to square waves, these square waves having a frequency representing the position signal, i.e., the position of the sensor element relative to the predetermined object (the relative position of which is being sensed). This frequency sensitive square wave is fed to an appropriate frequency sensitive circuit which provides a position signal which can be used to control the position of a device or to indicate position, as may be desired.

It is therefore an object of this invention to provide an improved position sensor circuit with a digital signal output having improved stability.

It is an additional object of this invention to provide a simple and economical, yet reliable and accurate, circuit for providing a digital frequency sensitive signal which is in accordance with the position of a sensor element.

Other objects of this invention will become apparent as the description proceeds in connection with the accompanying drawings of which:

Figure 1:
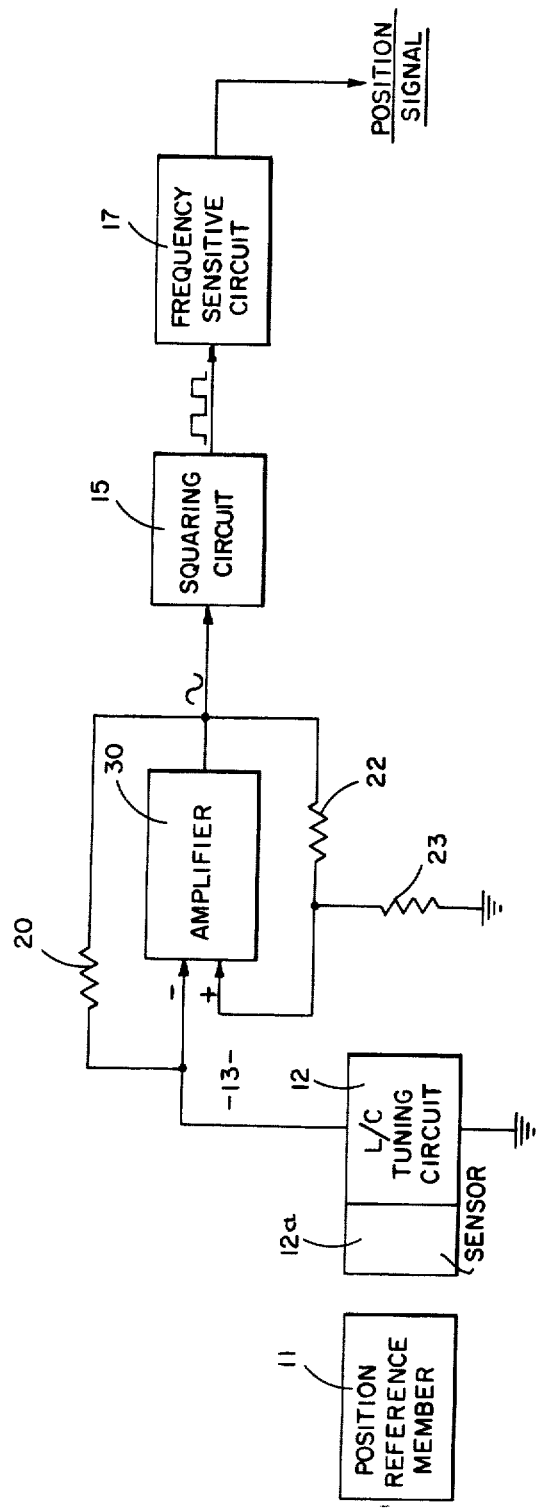
FIG. 1 is a functional block diagram of the circuit of the invention.

Referring now to FIG. 1, a functional block diagram illustrating the invention is shown. L/C tuning circuit 12 has a reactive sensing element 12a, this sensing element being positioned in close proximity to a position reference member 11. As the position of reactive sensing element 12a changes relative to position reference member 11, the reactance of the sensing element changes. Typically, in the case of an inductively reactive sensing element 12a, the position reference member may comprise a member of magnetic material which changes the inductance (and inductive reactance) of the sensing element as the relative position between the reference member and sensing element changes, or in the case of a capacitively reactive sensing element, the position reference member may comprise one of the elements of the capacitor such that the effective capacitance (and capacitive reactance) of the sensing element changes as the spacing between the reference member and sensing element changes. The resonant frequency of L/C tuning circuit 12 thus varies as a function of the relative position between reactive sensing element 12a and position reference member 11.

Tuning circuit 12 determines the frequency of oscillation of oscillator 13. The tuning circuit is also in the negative feedback circuit of the oscillator and forms a voltage divider circuit along with resistor 20 between the output of amplifier 30 and the input thereof. Positive feedback is provided between the output of amplifier 30 and the positive input thereto by means of a resistive voltage divider formed by resistors 22 and 23. Resistors 20, 22 and 23 are chosen so that at the resonant frequency of the oscillator, the positive feedback provided through the resistive divider formed by resistors 22 and 23 will just barely exceed the negative feedback provided through resistor 20 and the tuning circuit, such as to sustain oscillation of the oscillator at this resonant frequency. An incipient change of oscillator frequency (not due to a retuning of tuning circuit 12) will be resisted in view of the fact that at frequencies other than the resonant frequency of the tuning circuit the impedance of the tuning circuit (assuming series resonance) rises, thereby effectively raising the negative feedback to the oscillator which tends to cut off oscillation. Oscillation therefore can only be sustained at the resonant frequency of the L/C tuning circuit and the oscillator therefore tends to lock-in at this frequency to provide stability of operation. Such stabilized operation is particularly significant in operating at low frequencies, such as in the audio range, where an oscillator circuit tends to have a relatively low Q.

The sine wave output of oscillator 13 is fed to squaring circuit 15 which operates to convert the sine waves to square waves. These square waves have a frequency which is a direct function of the relative position between reactive sensing element 12a and position reference member 11. The output of squaring circuit 15 is fed to frequency sensitive circuit 17 which provides a position signal output which may be used to drive a servo mechanism for control purposes or which may be used to provide the input for an indicator device.

Figure 2:
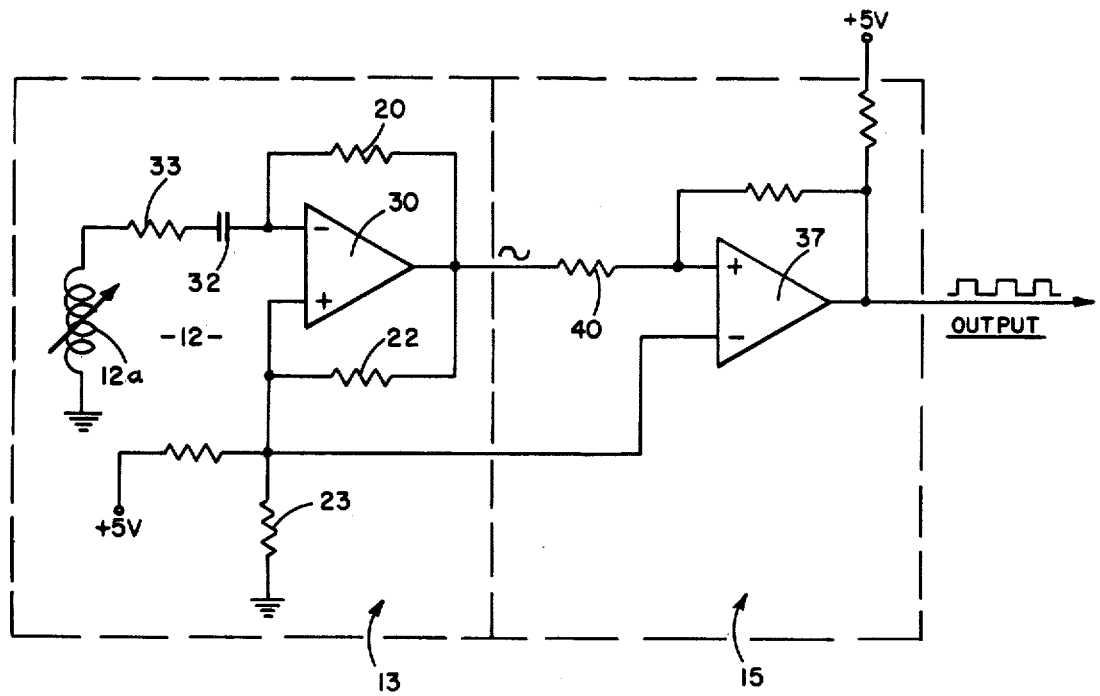
FIG. 2 is a schematic drawing of a first embodiment of the invention.

Referring now to FIG. 2, a first embodiment of the invention is schematically illustrated. Oscillator 13 is formed by operational amplifier 30. Positive feedback is provided from the output to the input of the amplifier by means of the voltage divider formed by resistors 22 and 23. Negative feedback is provided from the output to the input of the amplifier by the voltage divider formed by resistor 20 and the tuning circuit 12 formed by capacitor 32, resistor 33 and variable inductor 12a which comprises the sensor element. As already explained, the inductance of inductor 12a may be varied in accordance with the position relative thereto of a member made of magnetic material which is mounted on the position reference member. Also, if so desired, the sensor element may comprise the capacitor 32 of the tuning circuit which varies in capacitance with relative movement of a position reference member.

The values of resistors 20, 22 and 23 are chosen such that the positive feedback to the input of the operational amplifier barely exceeds the negative feedback fed thereto. It is to be noted in this regard that at the resonant frequency of the oscillator, as determined by tuning circuit 12, the impedance of the series resonant tuning circuit which is connected between the negative input of the operational amplifier and ground is very low, thus assuring that the positive feedback to the amplifier will be greater than the negative feedback thereto. Any change in oscillation frequency from that determined by the tuning circuit is resisted in view of the fact that at other than the resonant frequency of the tuning circuit, the impedance of this circuit between the negative input to the amplifier and ground increases, thereby increasing the negative feedback to the amplifier, which tends to terminate oscillation. This effectively tends to "lock-in" the operation of the amplifier at the resonant frequency of the tuning circuit and resist incipient changes in this frequency due to factors other than a retuning of the resonant circuit. In this manner, the operation of the oscillator is stabilized to provide a reliable and accurate frequency output for a given resonant frequency of the tuning circuit as it is changed in response to relative movement of the position reference member 11 (see FIG. 1). The output of oscillator 13 is fed to squaring circuit 15 which includes an operational amplifier 37. This amplifier has the sine wave output of the oscillator fed to the positive input thereof through resistor 40. The negative input of operational amplifier 37 has a DC reference voltage fed thereto from resistor 23. Operational amplifier 37 acts to positively and negatively limit or "clip" the sine wave output of the oscillator so as to form a square wave output.

Figure 3:
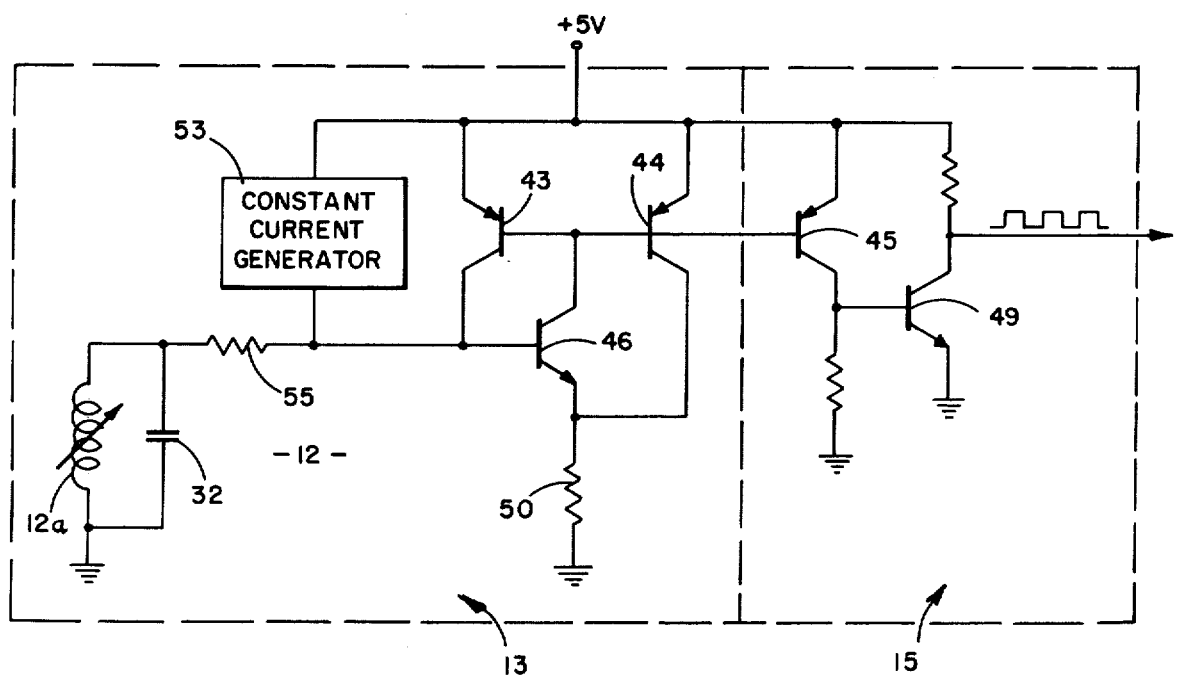
FIG. 3 is a schematic drawing of a second embodiment of the invention.

Referring now to FIG. 3, a second embodiment of the invention is schematically illustrated. This circuit employs a plurality of matched transistors 43-45 which have substantially equal collector currents. In this circuit, positive feedback is provided by transistor 43 and negative feedback is provided by transistor 44 with transistor 46 providing the difference amplifier effect. Constant current is provided to the transistors by the constant current generator 53 which may be implemented by means of a transistor circuit which is well known in the art. The voltage gain for the negative feedback circuit is determined by resistor 50. The gain for positive feedback is determined by the series impedance of resistor 55 and the parallel resonant circuit formed by inductor 12a and capacitor 32 which form the tuning circuit. At the resonant frequency of the tuning circuit, the impedance of the parallel resonant circuit is very high and, hence, the positive feedback exceeds the negative feedback, resulting in oscillation. At frequencies other than resonance, the impedance of the tuned circuit drops, such that the negative feedback exceeds the positive feedback, thereby cutting off oscillation. The circuit thus operates in similar fashion to that of the first embodiment with the biasing being arranged so that oscillation will occur only within a narrow frequency range determined by the values of the components of the tuning circuit, and particularly that of the sensor element 12a which varies in accordance with the position signal. The sinusoidal output of the oscillator is fed from transistor 44 to transistor 45 and thence to transistor 49 which operate to positively and negative clip the sine wave to provide a digital square wave output having a frequency in accordance with the position signal. It is to be noted that in an operative embodiment of the invention, the frequency of operation is of the order of 800–2000 Hz.

While the invention has been described and illustrated in detail, it is to be clearly understood that this is intended by way of illustration and example only and is not to be taken by way of limitation, the spirit and scope of this invention being limited only by the terms of the following claims.

I claim:

1. A position sensor for providing a digital signal output in accordance with the relative position between a sensing element and a predetermined object comprising an oscillator having an L/C tuning circuit, said sensing element comprising at least a portion of the tuning circuit, the reactance of said sensing element and the resonant frequency of the tuning circuit varying as a function of the relative position between the sensing element and the object, a negative feedback loop from the output of the oscillator to the input thereof, a positive feedback loop from the output of the oscillator to the input thereof, one of said loops including said L/C tuning circuit and a resistor connected in series with said tuning circuit to form a voltage divider therewith, the connection between said tuning circuit and said resistor being connected to said oscillator input, the positive feedback being slightly greater than the negative feedback at the resonant frequency of the tuning circuit and less than the negative feedback at frequencies above and below said resonant frequency, thereby sustaining oscillation at said resonant frequency, means for converting the output of said oscillator to a square wave at said resonant frequency, whereby the value of said frequency represents said relative position, and means responsive to said square wave for generating a position signal in accordance with said relative position.

2. The sensor of claim 1 wherein said tuning circuit comprises a series L/C circuit, said negative feedback loop comprising a voltage divider including a resistor connected in series with said L/C circuit, said positive feedbck loop comprising a resistive voltage divider.

3. The sensor of claim 1 wherein said tuning circuit comprises a parallel L/C circuit, said positive feedback loop comprising a voltage divider including a resistor connected in series with said parallel L/C circuit, said negative feedback loop comprising a resistive voltage divider.

4. The sensor of claim 1 wherein said sensing element comprises an inductor.

* * * * *